(12) United States Patent
Matiere

(10) Patent No.: US 6,484,758 B2
(45) Date of Patent: *Nov. 26, 2002

(54) CONDUIT FOR CIRCULATION OF FLUID UNDER PRESSURE

(75) Inventor: Marcel Matiere, Aurillac (FR)

(73) Assignee: Societe Civile de Brevets Matiere, Aurillac (FR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/289,183

(22) Filed: Apr. 9, 1999

(65) Prior Publication Data

US 2002/0144741 A1 Oct. 10, 2002

Related U.S. Application Data

(63) Continuation-in-part of application No. 08/765,422, filed as application No. PCT/FR95/00868 on Jun. 28, 1995, now Pat. No. 5,904,185.

(30) Foreign Application Priority Data

Jun. 29, 1994 (FR) .............................. 94 08030
Jan. 29, 1999 (FR) .............................. 99 01050

(51) Int. Cl.⁷ .................................................. F16L 3/00
(52) U.S. Cl. ...................................... 138/106; 138/157
(58) Field of Search ............................... 138/102, 105, 138/106, 157, 107

(56) References Cited

U.S. PATENT DOCUMENTS

| 429,041 A | * | 5/1890 | Lynch ........................ 138/106 |
| 661,286 A | * | 11/1900 | Colton ........................ 138/106 |
| 822,047 A | * | 5/1906 | Hooper et al. ............... 138/157 |
| 889,796 A | * | 6/1908 | Lowther ...................... 138/102 |
| 950,149 A | * | 2/1910 | Dujardin ................. 138/157 X |
| 1,541,918 A | * | 6/1925 | Brennan ..................... 138/106 |
| 1,934,853 A | * | 11/1933 | Holmes ...................... 138/102 |
| 1,982,995 A | * | 12/1934 | Lane .......................... 138/106 |
| 2,136,635 A | * | 11/1938 | Peterson .................... 138/106 |
| 2,702,564 A | | 2/1955 | Busch |
| 2,850,182 A | * | 9/1958 | Tefyak ....................... 138/106 |
| 4,314,775 A | * | 2/1982 | Johnson ..................... 138/105 |
| 4,735,234 A | * | 4/1988 | Matiere ..................... 138/105 |
| 5,904,185 A | * | 5/1999 | Matiere ..................... 138/157 |

FOREIGN PATENT DOCUMENTS

| EP | 0 392 912 A3 | 10/1990 | |
| FR | 935451 | 6/1948 | |
| FR | 2 599 783 A1 | 12/1987 | |
| GB | 21275 | * 9/1985 | ................ 138/106 |
| GB | 2 174 472 A | 11/1986 | |

* cited by examiner

Primary Examiner—James Hook
(74) Attorney, Agent, or Firm—Connolly Bove Lodge & Hutz LLP

(57) ABSTRACT

The invention relates to a conduit for circulation of fluid comprising a sealed pipe (A) fixed to a rigid supporting body (B) comprising a horizontal base having a lower face bearing on a laying surface (C) and two lateral wings going up vertically along the sites of the lower section of the pipe (A), said supporting body (B) comprising, on either side of the tubular enclosure (A), a single-piece portion (31, 31') having, as a transversal section, a L-shaped profile comprising a substantially vertical branch (32) forming the wing extending along the corresponding side of the enclosure (A) and a substantially horizontal branch (33) extending beneath the former in order to form at least a portion of the base (3) of the supporting body (B) resting on the ground (C).

13 Claims, 3 Drawing Sheets

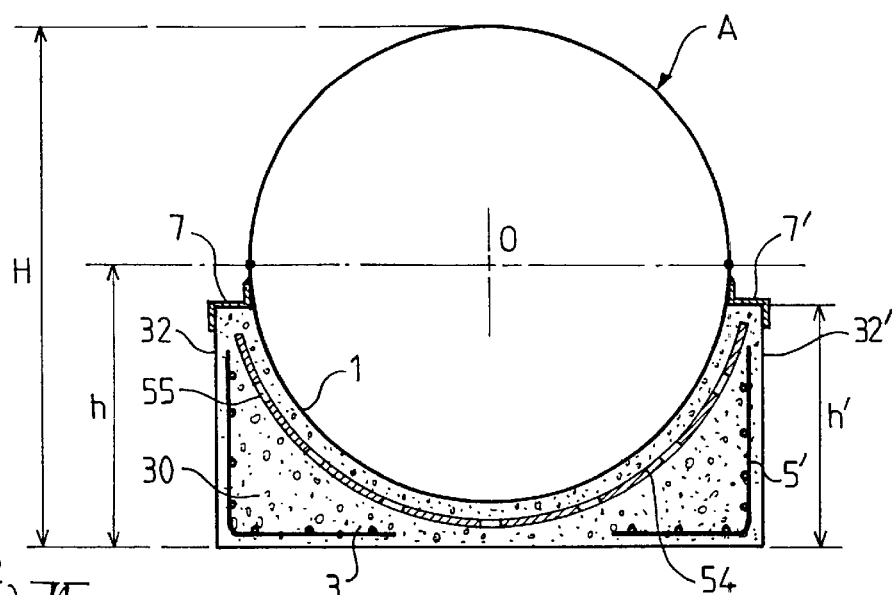
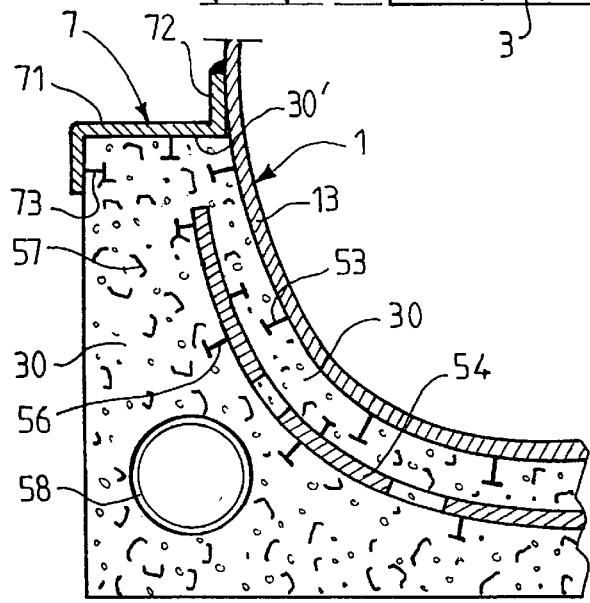
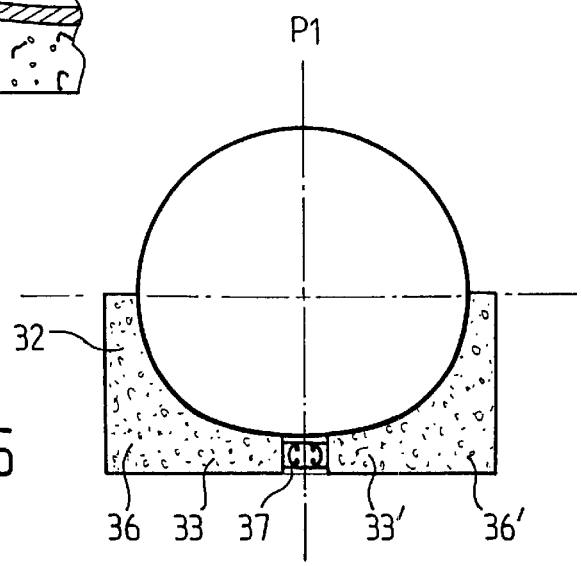

CONDUIT FOR CIRCULATION OF FLUID UNDER PRESSURE

CROSS-REFERENCE TO RELATED APPLICATION

This application is a continuation in part of application Ser. No. 08/765,422, filed of Jun. 28, 1995. Now U.S. Pat. No. 5,904,185, which is a 371 of PCT/FR95/00868, filed Jun. 28, 1995.

FIELD OF THE INVENTION

This invention relates to a fluid circulation conduit, of very large transversal section, liable to exceed 2 m$^2$, which can be buried under an embankment and more particularly intended for the circulation of fluid under high pressure, in the order of several bars.

BACKGROUND OF THE INVENTION

A fluid transportation conduit can be made simply in the form of metal or concrete pipe elements, butt jointed and having ends inserted into one another, with interposed joints. In case of sinking, some elements may come loose and therefore, to resist relatively high pressures, it is preferable to use metal pipes whose elements are welded at their adjacent ends, for instance, in the case of forced conduit for hydro-electrical plants.

In such a case, the conduit is composed of prefabricated pipe elements or of curved panels, which are transported to the site and welded there. At that point; however, the pipe is not under pressure and may deform while taking an oval shape, which makes welding more difficult since the sheets would no longer be aligned.

Besides, such pipes must often be buried, for instance in the case of pipelines or gas-lines. When the pipe is under pressure, it can easily sustain the loads applied externally by the embankment. But the pressure may vary and even become negative with respect to the outside. There is then a high risk of deformation of the pipe.

For all these reasons, the pipes made by welding metal elements generally have a relatively limited section, most often smaller than 2 m$^2$.

The present invention is intended to produce conduits for the transportation of fluid under pressure which do not exhibit such shortcomings.

With such a technique, the conduit is composed of a sealed thin-walled pipe, normally a metal pipe, fastened to a rigid supporting body, usually made of reinforced concrete or preloaded concrete. Thus, the metal pipe enables the system to be sealed and to resist the internal pressure, the thin wall being solely subjected to traction stresses, while the concrete body makes the conduit rigid while bearing upon the laying surface on a widened surface which distributes the loads applied and better resists differential sinking.

In the technique described in parent U.S. patent application Ser. No. 08/765,422 filed Jun. 28, 1995, now U.S. Pat. No. 5,904,185, the concrete supporting body consists advantageously of three sections, respectively a horizontal base bearing on the ground and two lateral bearing parts forming vertical legs along each side of the pipe, whereby the assembly exhibits a U-shaped profile completely surrounding the lower section of the pipe. The pipe therefore consists, as a straight section, of four panels, respectively a lower panel applied onto the base, two lateral panels applied respectively onto both lateral legs and an upper panel with two lateral edges which connect tangentially to the corresponding ends of two side panels. The side panels are held by both legs of the supporting body and their opposite edges can thus be perfectly aligned for welding purposes.

Such a conduit can be made easily from prefabricated elements whose length is compatible with the transportation and handling capacities.

The invention further in simplifies the production technique of such a conduit, in particular to make the various prefabricated elements lighter and to facilitate their installation, while retaining the various advantages provided by the prior.

SUMMARY OF THE INVENTION

The invention relates generally to a fluid circulation conduit, of large transversal section, in excess of 2 m$^2$, comprising a pipe having a longitudinal axis and fixed on a rigid supporting body bearing on a laying surface. The pipe forms a sealed tubular enclosure constituted of a plurality of juxtaposed than walled panels and comprising a lower part having a U-shaped profile with two sides and an upper part, the supporting body comprising a horizontal base with a lower plane face bearing on the laying surface and two lateral wings extending vertically along the sides of the lower part of the tubular enclosure. The supporting body comprises, on either side of the tubular enclosure, a single-piece portion having, in cross-section, an L-shaped profile comprising a substantially vertical branch forming a lateral wing of the supporting body extending along the corresponding side of the lower part of the pipe and a substantially horizontal branch extending beneath the lower part of the pipe and forming at least a portion of the base of the supporting body resting on the laying surface.

Particularly advantageously, at least over a certain length of the pipe, both lateral wings and the base of the supporting body form a unitary piece.

According to another embodiment, at least over a certain length of the pipe, the supporting body comprises two L-shaped profile pieces whose horizontal branches connect on either side of the median plane of the pipe passing through the longitudinal axis, so as to form a continuous base.

Normally, the supporting body is made of reinforced concrete and the reinforcement can be made conventionally to sustain the loads applied, in particular, loads tending to spread the lateral sections apart. However, according to another particularly advantageous feature, the reinforcement may be made of at least one curved sheet, embedded in the concrete supporting body and having two branches, respectively horizontal and vertical, each into the corresponding branch of each L-shaped portion of the supporting body.

Preferably, to ensure transmission continuity of the loads, each L-shaped lateral part of the supporting body comprises an internal face for application and fixation of the enclosure, whose orientation varies gradually between a substantially horizontal lower section and a substantially vertical upper section.

The invention will be understood better by the following description of certain embodiments given by way of example and shown in the appended drawings.

BRIEF DESCRIPTION OF THE DRAWINGS

FIG. 3 shows a second embodiment.

FIG. 4 is a detail view of the second embodiment of.

FIG. 5 is a transversal sectional view of a third embodiment.

DETAILED DESCRIPTION OF THE PREFERRED EMBODIMENT

Figure 1:
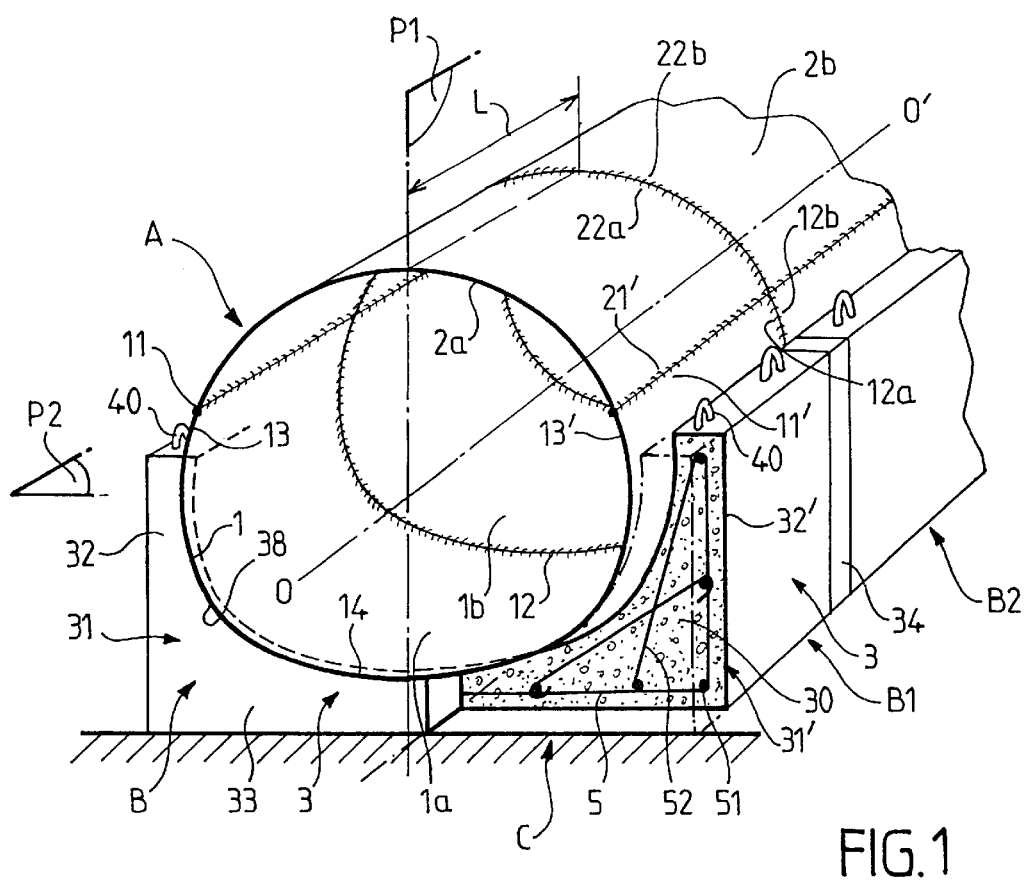
FIG. 1 is a schematic view, in transversal and perspective section, of a portion of a conduit according to the invention.

FIG. 1 is a schematic representation, in perspective, of a portion of a conduit according to the invention consisting, generally, of a pipe A associated with a concrete supporting body B. The pipe A consists of curved metal panels, welded along their adjacent edges, the number of panels depending on the passage section to be provided. For a passage section of about 2 meters in width, the pipe A may comprise two panels only, respectively a lower panel 1 constituting the lower part of the tubular enclosure and an upper panel 2 constituting the upper part, panels 1, 2 being welded along their longitudinal adjacent edges 11, 21, 11', 21'. Each panel 1, 2 has in the direction of the longitudinal axis O, O' of the conduit, a length L depending on the transportation possibilities. The panels 1a, 1b, 2a; 2b of two successive sections of the pipe, are welded along their opposite transversal edges 12a, 12b, 22a, 22b, in order to constitute a sealed tubular enclosure A resisting internal pressure.

The tubular enclosure A is applied onto a supporting body B which completely surrounds its lower section and therefore exhibits a U-shape comprising a base 3 and two lateral wings 31, 31' extending vertically along both lateral sides of the enclosure A. The assembly is symmetrical with respect to a vertical medium plane P1 passing through the longitudinal axis O, O'.

Both wings 31, 31' of the base B extend up substantially to the level of the horizontal diametrical plane P2 of the pipe, passing through the axis O, O' and even slightly above this plane in the embodiment represented in FIG. 1.

Both lateral sides 13, 13' of the lower panel 1 of the enclosure A may extend above the plane P2 since they are stiffened by both wings 31, 31' of the base and their longitudinal edges 11, 11' are therefore held parallel and aligned with the corresponding edges of the portion of the conduit already provided, which facilitates the installation and the welding of the upper panel 2. The lower panel 1 then covers an angular sector greater than 180°, with a re-entrant angle, whereas the upper panel 2 covers the complementary angular sector.

The upper part of the pipe A made up of the upper panel 2 and of the sides 13, 13' of the lower panel 1, which connect tangentially, exhibits advantageously the shape of a sector of a cylinder of revolution centered on the axis O, O', at least down to the diametrical plane P2. Thus, the enclosure A is able to resist the loads applied in best conditions. Indeed, the application of an internal pressure solely determines the traction loads in the metal wall which is easily calculated and whose thickness may be relatively small. It should be noted that the semi-circular shape of the wall 2, 13, 13' enables the latter to resist in best conditions, not only an internal pressure but also external loads, for instance, in the case of a conduit buried under an embankment before pressurizing the fluid inside the enclosure A.

The lower portion 1 need not to be semi-circular and may even be flat, since the base 3 of the concrete supporting body B and the reinforcements thereof can be designed so as to resist the bending stresses.

In the embodiment described in the parent U.S. patent application Ser. No. 08/765,422, the supporting body consisted of three sections, respectively a base extending beneath the lower section of the enclosure and two lateral bearing parts which maintain the sides of the enclosure and which are pushed against the lateral faces of the base by preloaded tie rods. Thus, the base is subjected to high compression stresses. Moreover, the junction between both lateral bearing parts and the base of the supporting body works as an articulation.

In the present invention, conversely, the supporting body B comprises, on either side of the enclosure A, a lateral portion consisting of a single-piece part 31 having, in transversal section, an L-shaped profile which comprises a substantially vertical branch 32 extending along the side corresponding to the enclosure A and a substantially horizontal branch 33 extending beneath the pipe to form at least a portion of the base 3 bearing on the ground, the L-shaped part 31 having a curved inside face 38.

Such a design guarantees the transmission continuity of the loads, whereby the spreading stresses applied by the lateral sides 13, 13' of the enclosure A on both wings 32, 32' of the supporting body B are absorbed by the base 3 of the supporting body.

Thus, the base is solely subjected to bending stresses resulting from the spreading tendency of the sides 32, 32' which are, moreover, compensated for by the weight of the pipe A and the application of the pressure onto its lower face 14.

The base 3 of the supporting body can then be made lighter and it is possible, even for very large sections, for instance those having a diameter in the order of three meters, to execute a unitary supporting body such as represented in FIG. 1.

The supporting body B will, normally, be made of reinforced concrete, for instance as indicated as a partial section on FIG. 1. The reinforcement 5 must then exhibit the desired U-shape and may consist, conventionally, of longitudinal reinforcing steel rods 51 associated with transversal reinforcements 52.

The lower face 14 of the tubular enclosure may have a curvature radius greater than that of the upper face 2 and can even be flat. However, the lower face 14, substantially horizontal, and the lateral sides 13, 13', substantially vertical, of the panel 1, are applied against the inside face 38 of the L-shaped part 31 of the body B, and it is preferable to provide a gradual transition between the vertical 32 and the horizontal 33 branches in order to guarantee transmission continuity of the stresses without any angular point. Preferably, inside face 38 is continuously curved so as to have an orientation which varies gradually between a substantially horizontal lower section and a substantially vertical section.

Figure 2:
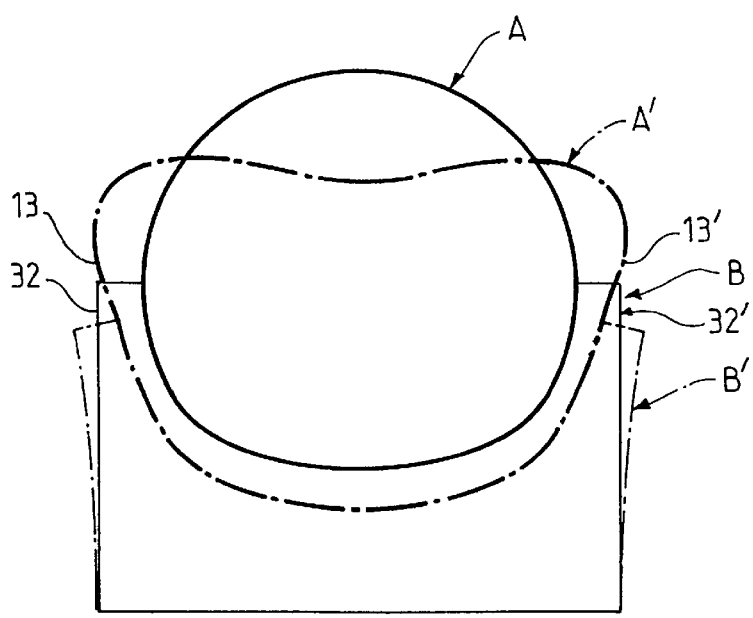
FIG. 2 shows schematically the deformation conditions of a conduit, in case of depression with respect to the outside.

By way of example, FIG. 2 represents schematically, in a solid line, a conduit according to the invention comprising a metal pipe A associated with a concrete base B and, as in a chain dotted line, the A', B', determined by calculation in the case of an excess pressure from the outside with respect to the inside of the conduit, for example under the weight of an embankment.

Obviously, the scale of deformations has been amplified to make them more visible, but it can be seen that, thanks to continuous transmission to the base 3, 33, 33' of the spreading stresses applied to the wings 32, 32', of the concrete supporting body B, the latter deforms gradually, whereby both wings 32, 32' maintain the rigidity of the tubular enclosure at the sides 13, 13' of the said enclosure without any risk of breakage at the junction with the concrete supporting body B.

Due to the excellent distribution of the stresses over the whole volume of the single-piece concrete supporting body B, the mass of that body can be reduced considerably with respect to prior art structures.

To make the structure still lighter, <<high performance concrete>> can advantageously be used, with compression and traction resistance far greater than that of ordinary concrete, for example above 40 MPa. Such a resistance stimulates interconnection and co-operation between the metal pipe A and the concrete supporting body B. In turn, increasing the performance of the concrete permits the use of high resistance steel. The thickness of the metal wall can then be reduced and, consequently, the global weight of the elements as well.

Moreover, as shown in FIGS. 3 and 4, it is possible to improve the junction between the metal wall A and the supporting body B using angle irons 7, 7', each forming at least one angle with a side 71 covering the upper face 30' of each wing 32, 32' of the supporting body B and a side 72 extending upwards and tangent to the external face of the corresponding lateral side 13, 13' of the thin wall A, at the outlet of the supporting body B. The side 71 is sealed in the concrete and the side 72 is welded on the external face of the lateral side 13, 13' which is thus stiffened and held against the wing 32, 32' of the supporting body B, thereby obviating any risk of separation liable to cause, for instance, water ingress.

The angle iron 7, 7' is fitted with sealing parts 73 and may advantageously cover the external edge of the upper face 30' of the supporting body B to reduce the risks of concrete cracking.

Preferably, the angle ions 7, 7' extend along the entire face 30' of the supporting body B, but they can also consist of simple sealing tabs, at a distance from one another.

According to another particularly advantageous feature, continuous transmission of the stresses in the supporting body B permits simplification of the reinforcement, as represented in FIGS. 3 and 4.

In such a case, indeed, the reinforcement can also consist essentially of a simple sheet 54 which is bent with the same curvature as the wall 1 of the enclosure A and the inside face 38 of the body B, sheet 54 being embedded in the concrete 30. Perforations 55 provided over the whole surface of the sheet 54 guarantee the penetration of the concrete for better interconnection. Moreover, as indicated in FIG. 4, the sheet 54 can also be provided, on both its faces, with protruding elements 56 for complete interconnection.

Both parallel sheets 1 and 54 connected by the concrete 30 co-operate, together as a curved crossbeam in order to absorb the spreading stresses of the lateral sides 32, 32'.

To avoid cracking, it suffices to place, in the angles of the supporting body B, a light reinforcement 5', for example a welded wire-netting, in particular along the external faces of the supporting body. However, according to another advantageous feature represented in FIG. 4, the concrete 30 can be a fibre concrete comprising, as already known, a plurality of metal fibers 57 distributed evenly in the supporting body of the concrete and oriented randomly. Thus, the concrete supporting body B can also be made lighter.

Due to the simplification of the reinforcement, as shown in FIG. 4, it is possible to provide, at each angle of the supporting body, a free space in which are placed butt jointed pipes 58 which can be involved in the resistance of the body B and delineate a longitudinal space for the passage, for instance, electric cables, of ducts or of longitudinal preloaded bars.

Figure 6:
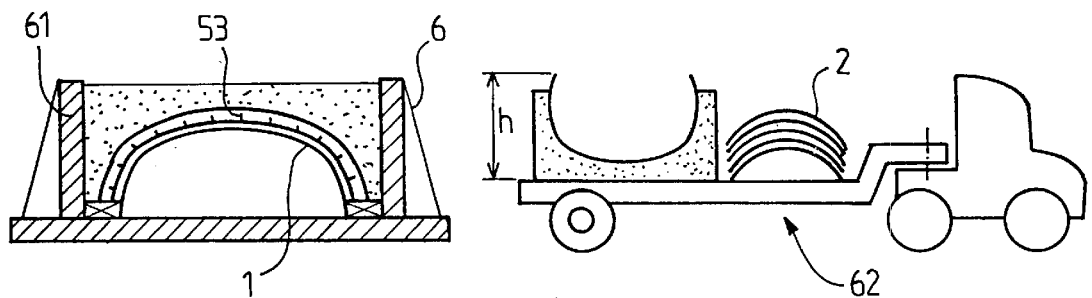
FIG. 6 shows schematically the execution and the transportation of the prefabricated elements.

The execution of the prefabricated elements and their implementation for the construction of a conduit according to the invention are particularly simple, as shown schematically in FIG. 6.

The lower portion 1 of the tubular enclosure A may consist, even for great sizes, of sheet panels which are press-bent or roll-bent in order to provide the requested curvature. To execute a prefabricated element of the conduit, the panel 1 is turned over and placed at the bottom of a mold 6 in order to constitute a disposable form. As shown in FIG. 6, the panel 1 has been provided in advance, on the top side, with interconnection elements 53 such as welded profiles. After installing the lateral faces 61 of the mold and the reinforcement 5, the panel 1 is placed and the concrete is cast up to the requested level to provide the necessary thickness to the base B.

It should be noted that the sheet-shaped reinforcement of FIGS. 3 and 4 could be fastened in advance, at the requested distance, on the panel 1.

After setting, the assembly is removed from the mold and turned over.

To handle the prefabricated element thus provided, the former must obviously be provided with anchoring points such as rings 40 sealed in the concrete at the upper portion of the wings 32, 32' and enabling slings to be hooked to the latter. If needed, the rings 40 can also be welded to the angle iron 7 sealed on the upper face 30' of the supporting body B.

Such prefabricated elements can be transported easily to the construction site, for example on a trailer 62, as shown in FIG. 6. It is thus possible to transport very large elements by road provided that the height h of the element, added that of the trailer, remains compatible with the road gauge. Indeed, it suffices to delineate the length L of the prefabricated element so that, when the latter is placed transversally on the trailer, the whole does not exceed the authorized width.

The upper panels 2 of the pipe, consisting of bent sheets, can be simply stacked for transportation to the site.

For the execution of the conduit, after having prepared the installation surface C, the prefabricated elements are placed in sequence along the longitudinal axis O, O' while adjusting the levels and the positioning so that the lateral edges 11a, 11b of the panels 1a, 1b of the element B1 to be installed and of the element B already installed, are placed in alignment with one another, so that corresponding transversal edges 12a, 12b contact each other.

The upper panel 2a can then be installed and the assembly can be welded along longitudinal joints 11, 21 and transversal joints 12, 22.

At each longitudinal end, the concrete supporting body B is stopped slightly recessed from the sheet 1 in order to leave between two consecutive elements B1, B2, a space 34 which makes the installation of the element and the welding of the sheets easier. The longitudinal reinforcement 51 are provided with standby portions that cross one another in this space 34 and are then embedded in a sealing mortar.

The execution of the conduit is therefore particularly easy, since the elements can be prefabricated in factory and then transported to the building site.

However, for very large sizes, it is also possible to execute the elements on site. The sheets 1, 2 can indeed be formed in the workshop and stacked on a trailer to be delivered to the yard, which only needs to be fitted with the necessary molds 6, whereby the latter are particularly simple. In the case of a large conduit, the element can then be constructed close to the yard on mobile prefabrication units.

Obviously, if the supporting body B can be made lighter, it must, be calculated in relation to the circumstances of use. For instance, when the conduit is located inside the groundwater table, the concrete supporting body advantageously operates as ballast and its mass is therefore determined accordingly.

To make the supporting body still lighter, it would be possible, as shown in FIG. 3, to give a circular profile to the tubular enclosure A which resists then by itself the internal pressure, without applying any bending stresses onto the base 3 which provides essentially for the rigidity of the enclosure, in particular during assembly, and serves to distribute the load over a large surface. However, in this configuration the total height H of the installation is increased and, for a large passage section, the embodiment with flattened base of FIG. 1 will generally be preferable.

While, it is particularly advantageous to provide a U-shaped single-piece concrete supporting body, it would also be possible as shown in FIG. 5, to provide two L-shaped portions 36, 36' having horizontal branches 33, 33' which connect in the medium plane P1 of the conduit. The enclosure would then be constructed so as to leave between the opposite faces of both branches 33, 33' a free space 37 in which standby reinforcements of both elements cross one another and co-operate with longitudinal reinforcements, whereby the assembly is embedded in a sealing mortar to provide the continuity of the base.

It is also possible to vary, the level of the longitudinal joints 11, 21 as well as the number of panels constituting the pipe A. However, the height (h') of the lateral sides 32, 32' must remain sufficient to maintain the rigidity of the sides 13, 13' and resist a crushing stress of the conduit when subjected to a depression with respect to the outside.

Figure 7:
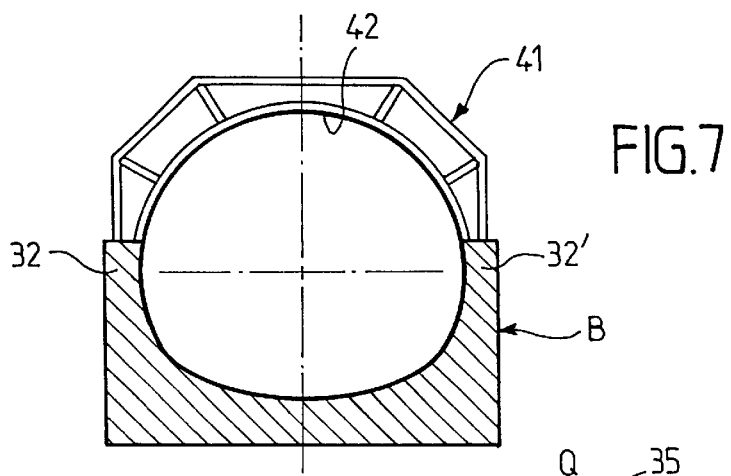
FIG. 7 shows a fourth embodiment with an interconnection crossbeam.

Obviously, the concrete supporting body B must be relatively resistant to enable handling, transportation and installation of prefabricated elements. To make the supporting body B as light as possible, it may sometimes, be desirable to strengthen it by using a linking crossbeam fixed on the upper ends of both wings 32, 32' in order to provide for the rigidity of the lower element during handling operations. This back-up crossbeam can be removably fastened to enable it to be removed after installation of the lower element to permit mounting of the upper panel 2. However, such a linking crossbeam can also exhibit advantages after the construction of the conduit. Indeed, as shown in FIG. 7, it can be shaped as a cradle 41 of mechanical-welded construction, spanning the conduit and exhibiting an inner profile 42 identical to that of the upper wall 2. Such a cradle 41 can also be fastened in advance to the upper panel 2 if the supporting body B is sufficiently resistant for handling operations. The cradle 41 then provides for the external protection and reinforcement of the panel 2 whose thickness can be reduced, whereas the thickness can be calculated solely in relation to the traction loads caused by internal pressure. The panel 2, thus reinforced by one or several cradles 41, will better resist crushing when the conduit is depressurized with respect to the outside.

A conduit according to the invention has still further advantages.

Figure 8:
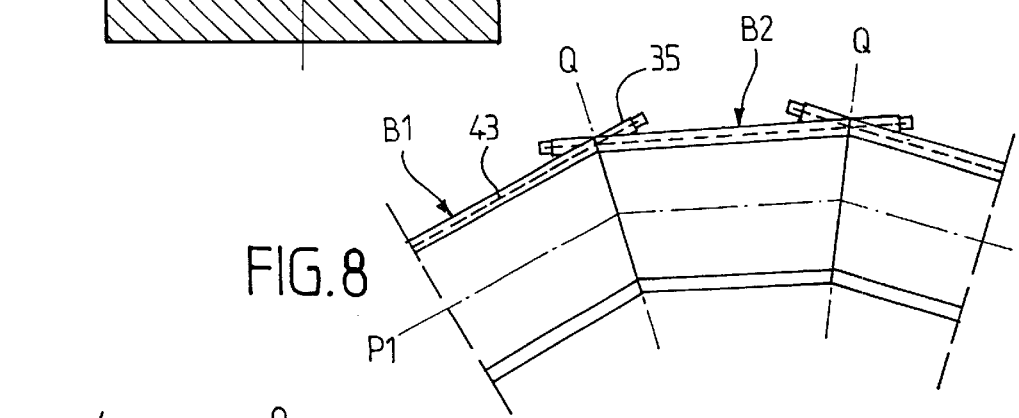
FIGS. 8 and 9 illustrate embodiments enabling a change of direction of the conduit axis.

For example, in curved portions of the conduit, the successive concrete elements can be linked to one another in order to prevent the conduit from slipping. As shown in FIG. 8, the prefabricated elements can easily be constructed so that the transversal jointing plan Q in which are placed the transversal edges 12, 22 of the enclosure A is tilted with respect to the longitudinal medium plane P1 of each prefabricated element in order to enable, a gradual change of direction. The successive elements can then be interconnected by preloaded tie rods 43 which can advantageously be inserted into the tubes 58 described previously with reference to FIG. 4, and whose ends bear upon bosses 35 provided, externally, at the ends of each element B1, B2.

Figure 9:
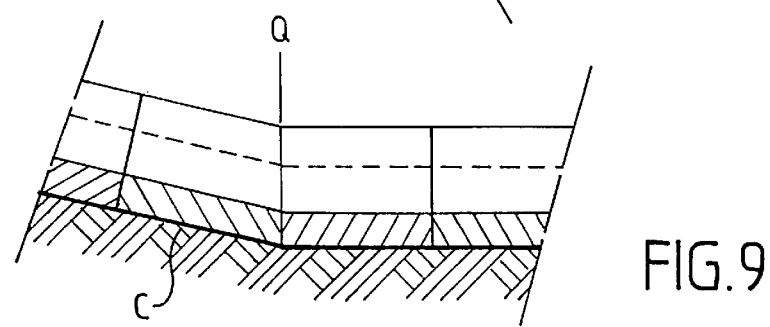

In a similar way, as shown in FIG. 9, the jointing plane Q can be titled with respect to the horizontal axis in order to suit any pitch variation of the laying surface C.

What is claimed is:

1. A conduit for the circulation of fluid, said conduit having a transversal section in excess of 2 square meters, and comprising a metallic pipe made up of a plurality of prefabricated elements positioned in sequence and welded to one another, said pipe having a longitudinal axis and attached to a rigid supporting body,
    (a) said pipe forming a sealed tubular enclosure, and each of said elements comprising a lower part having a U-shaped profile with two sides and an upper part;
    (b) said supporting body comprising a horizontal base with a lower plane face bearing on the laying surface and two lateral wings extending vertically along the sides of the lower part of the tubular enclosure;
    (c) wherein the supporting body comprises, on either side of the tubular enclosure, a substantially continuous portion completely surrounding said lower part of said tubular enclosure, and having, in cross-section, an L-shaped profile comprising a substantially vertical branch forming a lateral wing of the supporting body extending along the corresponding side of the lower part of the pipe and a substantially horizontal branch extending beneath said lower part of the pipe and forming at least a portion of the base of the supporting body resting on a support surface; and
    (d) wherein at least over a predetermined length, the supporting body is a unitary piece, and the horizontal branches of both L-shaped portions meet to form the base of the supporting body.

2. The conduit according to claim 1, wherein at least over a predetermined length, the supporting body comprises of two L-profiled portions with horizontal branches whose opposite ends are interconnected in the medium plane of the enclosure passing through the longitudinal axis so as to constitute a continuous base.

3. The conduit according to claim 1, wherein the supporting body is made of reinforced concrete.

4. The conduit according to claim 3, wherein at least in each L-shaped portion, the supporting body is reinforced by a curved sheet embedded inside the concrete and having horizontal and vertical branches, each extending in the corresponding branch of the L-shaped portion of the supporting body.

5. The conduit according to claim 1, wherein each L-shaped section of the supporting body comprises an internal face for application and attachment of the enclosure, whose orientation varies gradually between a substantially horizontal lower section and a substantially vertical upper section.

6. The conduit according to claim 5, wherein the internal face of both branches of each L-shaped section as well as the corresponding sections of the tubular enclosure have a curvature radius which varies continuously, without any angular point.

7. The conduit according to claim 1, wherein the supporting body is made of reinforced fiber concrete.

8. The conduit according to claim 1, wherein each vertical branch of the supporting body is covered at least partially with an angle iron forming at least one angle with one side sealed on the upper face of the branch of the supporting body and one side tangent to the lateral side of the enclosure, at the outlet of the supporting body, and welded onto the latter.

9. The conduit according to claim 1, wherein the supporting body is made of high performance concrete, with compression resistance in excess of 40 MPa.

10. The conduit according to claim 1, wherein the supporting body is provided with a reinforcement composed of at least one curved sheet embedded in the concrete and substantially parallel to the lower section of the enclosure, said sheet extending upwardly into the vertical branches of the supporting body.

11. The conduit according to claim 1, wherein it is associated with a number of spaced cradles distributed along the conduit and having an internal face surrounding the upper section of the tubular enclosure.

12. The conduit according to claim 1, wherein it is composed of prefabricated juxtaposed elements, each extending over a predetermined length of the conduit and each comprising a supporting body associated with at least one sheet forming the lower portion of the enclosure and at least one panel closing the upper portion of the enclosure and having two lateral sites welded on the longitudinal edges of the sheet.

13. The conduit according to claim 12, wherein at least two successive elements are terminated, at their adjacent ends, by transversal jointing planes tilted with respect to the axis of the pipe, so as to ensure a change of direction of the axis of the conduit.

* * * * *